United States Patent [19]

Bluhm

[11] Patent Number: 5,784,589

[45] Date of Patent: Jul. 21, 1998

[54] DISTRIBUTED FREE REGISTER TRACKING FOR REGISTER RENAMING USING AN AVAILABILITY TRACKING REGISTER ASSOCIATED WITH EACH STAGE OF AN EXECUTION PIPELINE

[75] Inventor: Mark W. Bluhm, Plano, Tex.

[73] Assignee: Cyrix Corporation, Richardson, Tex.

[21] Appl. No.: 607,567

[22] Filed: Feb. 27, 1996

Related U.S. Application Data

[63] Continuation-in-part of Ser. No. 138,789, Oct. 18, 1993, abandoned.

[51] Int. Cl.$^6$ .................................................. G06F 9/38
[52] U.S. Cl. ............................................................. 395/393
[58] Field of Search .................................... 395/393, 394, 395/580, 586, 591

[56] References Cited

U.S. PATENT DOCUMENTS

| | | | |
|---|---|---|---|
| 4,901,233 | 2/1990 | Liptay | 395/491 |
| 4,992,938 | 2/1991 | Cocke et al. | 395/393 |
| 5,452,426 | 9/1995 | Papworth et al. | 395/393 |
| 5,493,669 | 2/1996 | Denman, Jr. | 395/460 |

*Primary Examiner*—Parshotam S. Lall
*Assistant Examiner*—Viet Vu

*Attorney, Agent, or Firm*—Andrew S. Viger; John L. Maxin

[57] ABSTRACT

In a pipelined processor having at least one execution pipeline for executing instructions, the execution pipeline including ID (decode), AC (address calculation), and EX (execution) processing stages to process instructions for the processor, the processor including a register translation system that controls a renaming of physical registers of the processor to logical registers thereof, a tracking circuit that tracks availability of the physical registers for the renaming, method of operation thereof and processor containing the same. The tracking circuit includes: (1) ID, AC and EX tracking registers corresponding to the ID, AC and EX processing stages, each of the ID, AC and EX tracking registers containing tracking indicators corresponding to physical registers of the processor to be tracked, (2) read detection circuitry that changes a particular tracking indicator of a particular tracking register from a "not-read" state to a "read" state when an instruction being processed in a particular processing stage corresponding to the particular tracking register causes the particular processing stage to read a value from a particular physical register corresponding to the particular tracking indicator and (3) combinatorial circuitry that designates the particular physical register as available for the renaming only when all particular tracking indicators of the ID, AC and EX tracking registers corresponding to the particular physical register are in the "not-read" state.

20 Claims, 5 Drawing Sheets

DISTRIBUTED FREE REGISTER TRACKING FOR REGISTER RENAMING USING AN AVAILABILITY TRACKING REGISTER ASSOCIATED WITH EACH STAGE OF AN EXECUTION PIPELINE

CROSS-REFERENCE TO RELATED APPLICATIONS

The present Application is a continuation-in-part of U.S. patent application Ser. No. 08/138,789, filed Oct. 10, 1993, entitled "Microprocessor Pipe Control and Register Translation," commonly assigned with the present invention and incorporated herein by reference, now abandoned.

TECHNICAL FIELD OF THE INVENTION

The present invention is directed, in general, to computing systems and, more specifically, to a system and method for tracking the availability of renamable, physical registers of a processor in which register renaming is employed.

BACKGROUND OF THE INVENTION

The ever-growing requirement for high performance computers demands that computer hardware architectures maximize software performance. Conventional computer architectures are made up of three primary components: (1) a processor, (2) a system memory and (3) one or more input/output devices. The processor controls the system memory and the input/output ("I/O") devices. The system memory stores not only data, but also instructions that the processor is capable of retrieving and executing to cause the computer to perform one or more desired processes or functions. The I/O devices are operative to interact with a user through a graphical user interface ("GUI") (such as provided by Microsoft WINDOWS™ or IBM OS/2™) a network portal device, a printer, a mouse or other conventional device for facilitating interaction between the user and the computer.

Over the years, the quest for ever-increasing processing speeds has followed different directions. One approach to improve computer performance is to increase the rate of the clock that drives the processor. As the clock rate increases, however, the processor's power consumption and temperature also increase. Increased power consumption is expensive and high circuit temperatures may damage the processor. Further, processor clock rate may not increase beyond a threshold physical speed at which signals may traverse the processor. Simply stated, there is a practical maximum to the clock rate that is acceptable to conventional processors.

An alternate approach to improve computer performance is to increase the number of instructions executed per clock cycle by the processor ("processor throughput"). One technique for increasing processor throughput is pipelining, which calls for the processor to be divided into separate processing stages (collectively termed a "pipeline"). Instructions are processed in an "assembly line" fashion in the processing stages. Each processing stage is optimized to perform a particular processing function, thereby causing the processor as a whole to become faster. "Superpipelining" extends the pipelining concept further by allowing the simultaneous processing of multiple instructions in the pipeline. Consider, as an example, a processor in which each instruction executes in six stages, each stage requiring a single clock cycle to perform its function. Six separate instructions can therefore be processed concurrently in the pipeline, the processing of one instruction completed during each clock cycle. The instruction throughput of an n-stage pipelined architecture is therefore, in theory, n times greater than the throughput of a non-pipelined architecture capable of completing only one instruction every n clock cycles.

Another technique for increasing overall processor speed is "superscalar" processing. Superscalar processing calls for multiple instructions to be processed per clock cycle. Assuming that instructions are independent of one another (the execution of each instruction does not depend upon the execution of any other instruction), processor throughput is increased in proportion to the number of instructions processed per clock cycle ("degree of scalability"). If, for example, a particular processor architecture is superscalar to degree three (i.e., three instructions are processed during each clock cycle), the instruction throughput of the processor is theoretically tripled.

These techniques are not mutually exclusive; processors may be both superpipelined and superscalar. However, operation of such processors in practice is often far from ideal, as instructions tend to depend upon one another and are also often not executed efficiently within the pipeline stages. In actual operation, instructions often require varying amounts of processor resources, creating interruptions ("bubbles" or "stalls") in the flow of instructions through the pipeline. Consequently, while superpipelining and superscalar techniques do increase throughput, the actual throughput of the processor ultimately depends upon the particular instructions processed during a given period of time and the particular implementation of the processor's architecture.

The effective throughput of a processor may be further increased by speculative execution of instructions following a conditional branch. Branch instructions occur on average every four to six instructions in x86-compatible programs. When the normal sequential flow of a program changes due to a branch instruction, the pipeline stages may stall while waiting for the processor to calculate, retrieve and decode the new instruction stream. Speculative execution allows the pipeline to execute instructions continuously following a branch without stalling the pipelines to wait for branch resolution. When the processor encounters a conditional branch instruction, it can predict whether the branch is to be taken and speculatively execute instructions at the predicted target address. If the prediction is correct, the instruction throughput of the processor is increased. If the prediction is incorrect, the processor must be capable of returning to the state in which it was at the time of the conditional branch so that execution of the proper instructions may resume. Processor performance gains are realized, however, if the conditional branch predictions are, on average, more often true than false.

When the result of a conditional branch instruction is mis-predicted, the execution pipelines must be restored to the point of the mis-predicted branch. In order to restore the pipelines to their prior state, however, requires that the state of each pipeline stage prior to the mis-predicted execution must be known. This can be accomplished by checkpointing all processor resources that may be modified by succeeding speculatively-issued instructions. Because a logical register is a processor resource that may be modified by a later-executed instruction, the contents of the physical registers corresponding to the most recent logical registers must be preserved until it is determined that the branch prediction is correct.

Furthermore, when an instruction passes through a pipeline, the processing of the instruction may require a physical register to be read. The time at which it is determined that a particular instruction requires a physical register to be read and the time at which the register is actually read are not, however, coincidental. In a processor architecture that allows physical registers to be renamed and used by other instructions executing in the same or a different pipeline, the possibility arises that the contents of a physical register may be altered by a second instruction before the execution of a first instruction requiring a read of that physical register is completed. Thus it is necessary to preserve the register contents until the read is accomplished, after which time the register may be used for another purpose.

Unfortunately, the period during which a physical register must be preserved is neither a function of time nor of the number of instructions processed after the determination was made that a particular instruction requires a read of a physical register. Furthermore, the period is not a function of the number of speculative instructions processed following a conditional branch. Therefore, timers or counters are unsuitable to assure that a physical register is preserved.

Therefore, what is needed in the art is a circuit and method for tracking the availability of physical registers in a superscalar or pipelined processor. A further need exists in the art for a circuit and method for tracking the availability of physical registers in a superscalar or pipelined processor capable of speculative execution and branch prediction.

SUMMARY OF THE INVENTION

To address the above-discussed deficiencies of the prior art, it is a primary object of the present invention to provide a way to determine which of the renamable physical registers of a processor are, in fact, available for renaming at any given time.

In the attainment of the above primary object, the present invention provides, in a pipelined processor having at least one execution pipeline for executing instructions, the execution pipeline including ID (decode), AC (address calculation), and EX (execution) processing stages to process instructions for the processor, the processor including a register translation system that controls a renaming of physical registers of the processor to logical registers thereof, a tracking circuit that tracks availability of the physical registers for the renaming, method of operation thereof and processor containing the same.

The tracking circuit includes: (1) ID, AC and EX tracking registers corresponding to the ID, AC and EX processing stages, each of the ID, AC and EX tracking registers containing tracking indicators corresponding to physical registers of the processor to be tracked, (2) read detection circuitry that changes a particular tracking indicator of a particular tracking register from a "not-read" state to a "read" state when an instruction being processed in a particular processing stage corresponding to the particular tracking register causes the particular processing stage to read a value from a particular physical register corresponding to the particular tracking indicator and (3) combinatorial circuitry that designates the particular physical register as available for the renaming only when all particular tracking indicators of the ID, AC and EX tracking registers corresponding to the particular physical register are in the "not-read" state.

The present invention therefore introduces, in effect, a "tagging" system in which each stage of the execution pipeline is able to designate the identity of any physical register it may be caused to read. If none of the aforementioned processing stages has read the contents of a particular physical register, the particular physical register may be considered as "free" for purposes of renaming. On the other hand, if even one of the aforementioned processing stages reads the contents from a particular physical register, the particular physical register is treated as unavailable until such time as the corresponding particular tracking indicators are cleared (to be described more fully, infra). Incidentally, "not-read" and "read" are pronounced in the past tense, rather than in the present tense.

In one embodiment of the present invention, the tracking circuit further comprises execution detection circuitry that forces the all particular tracking indicators of the ID, AC and EX tracking registers corresponding to the particular physical register to the "not-read" state when the instruction completes the EX processing stage. Once the particular instruction has completed the EX processing stage, it is no longer necessary to prevent the particular physical register from being renamed and therefore reused. Accordingly, it is preferable to force the tracking indicators corresponding to the particular physical register being freed to the "not-read" state, thereby allowing the combinatorial circuitry to designate the particular physical register as available.

In one embodiment of the present invention, the processor further comprises a checkpoint system capable of checkpointing physical registers for purposes of speculative execution, the combinatorial circuitry designating the particular physical register as available for the renaming only when the checkpoint system has not checkpointed the particular physical register. In a manner to be explained, the present invention may find advantageous use in a processor employing branch prediction and speculative execution. In such environment, it is important to checkpoint the state of the processor before undertaking speculative execution to allow the state to be recovered if the branch is mis-predicted. If the particular physical register is checkpointed, it is important that the particular physical register not be made free or available for renaming until the checkpoint is removed.

In one embodiment of the present invention, the tracking circuit further comprises an availability register that contains availability indicators corresponding to the physical registers of the processor to be tracked, the combinatorial circuitry changing a particular availability indicator corresponding to the particular physical register from an "available" state to a "not-available" state when any of the particular tracking indicators of the ID, AC and EX tracking registers corresponding to the particular physical register is in the "read" state. In a manner to be described more fully, the availability of each of the renamable physical registers of the processor is stored in the availability register. This register may be scanned to determine which physical registers are available for renaming. Alternatively, of course, the output of the combinatorial circuitry may be directly scanned to determine what physical registers are available for renaming to eliminate a need for the availability register.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, and the advantages thereof, reference is now made to the following descriptions taken in conjunction with the accompanying drawings, in which like numbers designate like elements, and in which.

DETAILED DESCRIPTION

Figure 1A:
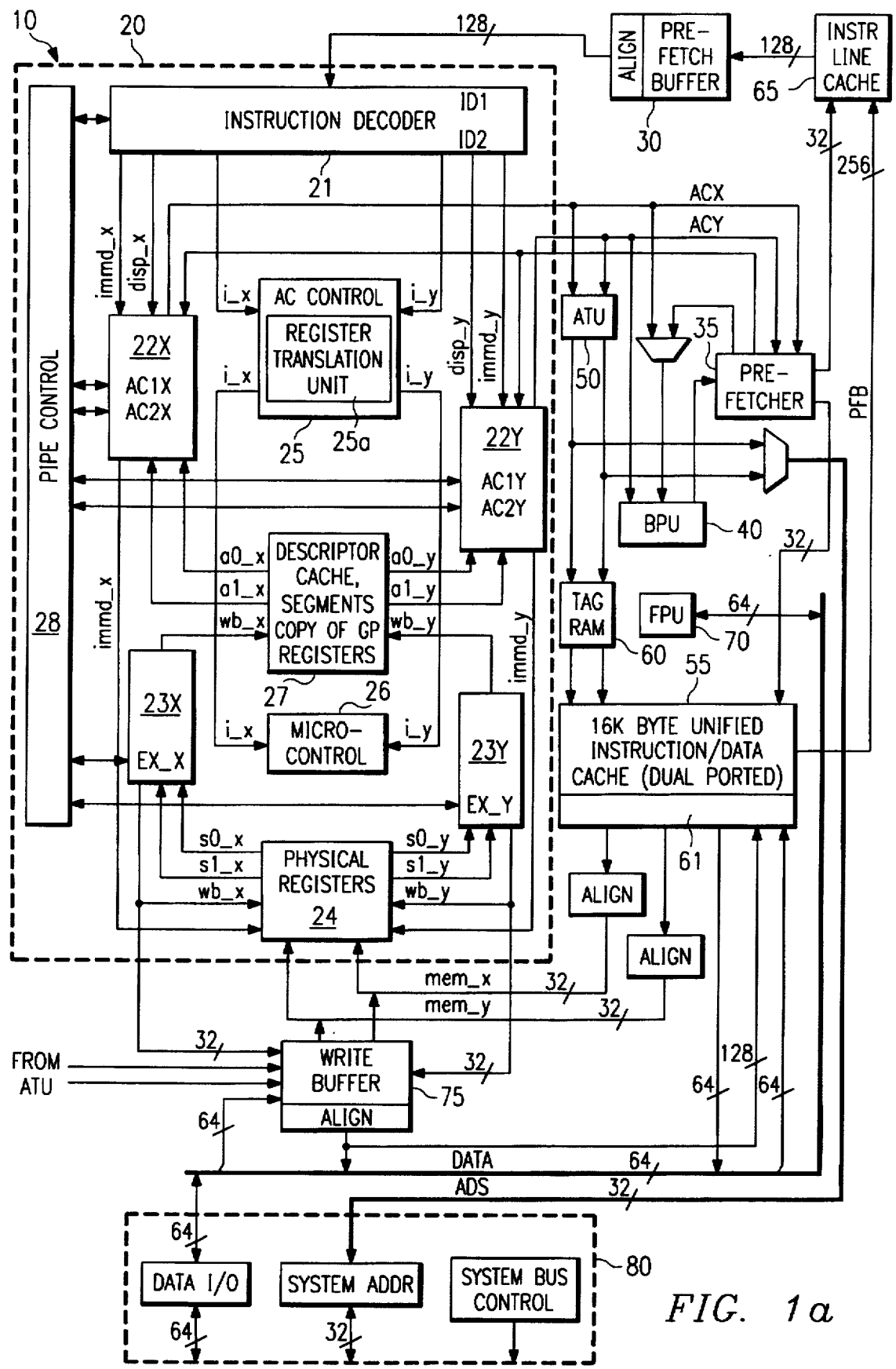
FIG. 1a illustrates a block diagram of an exemplary superscalar and superpipelined processor in accordance with the principles of the present invention.

Referring initially to FIG. 1a, illustrated is a block diagram of an exemplary superscalar and superpipelined processor 10 in accordance with the principles of the present invention. Exemplary processor 10 includes a processor core 20, a prefetch buffer 30, a prefetcher 35, a branch processing unit ("BPU") 40, an address translation unit ("ATU") 50, a unified cache 55, TAG random access memory ("TAG RAM") 60, an instruction line cache 65, an onboard floating point unit ("FPU") 70, a plurality of write buffers 75, and a bus interface unit ("BIU") 80. Each of the above-identified components is conventional, i.e., their functionality is known. The functionality associated with the interrelationship of various ones of the components is also known. "Associated with," as the term is used herein, means to include within, interconnect with, contain, be contained within, connect to, couple with, be communicable with, juxtapose, cooperate with, interleave or the like is also known. Exemplary processors implementing the foregoing are available from Cyrix Corp. of Richardson, Tex. Cyrix Corp. manufactures the M1, M5, M6 and M7 processors.

In an exemplary embodiment, instruction line cache 65 and unified cache 55 respectively operate as primary and secondary instruction caches, each having a 32 byte line size. This implementation suitably reduces instruction fetches to unified cache 55. In a preferred embodiment, instruction line cache 65 may suitably be a 256 byte cache, while unified cache 55 may suitably be a 16 kilobyte ("Kbyte") code/data cache. Unified cache 55 may also suitably be associated with TAG RAM 60. In another exemplary embodiment, processor 10 may suitably use a 32-bit address bus ("ADB"), a 64-bit data bus ("DBS") and a 256 bit pre-fetch bus ("PFB"). The PFB corresponds to the 32 byte line sizes of unified cache 55 and instruction line cache 65, and suitably enables a full line of 32 instruction bytes to be transferred to instruction line cache 65 in a single clock cycle.

Unified cache 55 is preferably 4-way set associative, using a pseudo-least-recently-used ("LRU") replacement algorithm, with selectively alternative write-through and write-back modes. Unified cache 55 is multi-ported (through banking) to permit two memory accesses (e.g., data reads, instruction fetches or data writes) per clock cycle. Instruction line cache 65 is preferably a fully associative, look-aside implementation (relative to the unified cache 55), using an LRU replacement algorithm.

Turning momentarily to exemplary processor core 20, illustrated is a superscalar and superpipelined design having two exemplary execution pipelines, designated X and Y, and including an instruction decode ("ID") stage 21, two address calculation ("AC") stages, 22X and 22Y, two execution ("EX") stages, 23X and 23Y, and a register file 24 having 31 32-bit registers. Core 20 further includes an AC control stage 25, a microcontrol unit 26, a second register file 27 containing a descriptor cache, segment registers and a copy of the logical general purpose registers, and a pipe control unit 28.

Exemplary ID stage 21 is operative to decode a variable length x86-based instruction set, and may suitably retrieve 16 bytes of instruction data from pre-fetch buffer 30 each clock cycle. Exemplary AC stages 22X and 22Y are each operative to perform address calculations for their respective execution pipelines. Exemplary EX stages 23X and 23Y are each operative to execute instructions within their respective execution pipelines. Exemplary register file 24 suitably includes 31 physical registers. Exemplary AC control stage 25, which includes a register translation unit 25a, and may further suitably include appropriately arranged register renaming hardware (not shown), is operative to control address calculations. Exemplary microcontrol unit 26, which may suitably include a micro-sequencer (not shown) and a micro-ROM (not shown), provides execution control. Again, exemplary second register file 27 may suitably include a descriptor cache, segment registers and a copy of the logical general purpose registers (i.e., as obtained from register file 24). Exemplary pipe control unit 28 is operative to control instruction flow through exemplary execution pipelines X and Y, whereby instruction order is maintained until pipe control unit 28 determines that a particular instruction will not cause an exception.

In an exemplary embodiment, register translation unit 25a has a capacity to map 32 physical registers to 8 logical registers. In the illustrated embodiment however, processor 10 includes only 31 physical registers, leaving register translation unit 25a with excess mapping capacity. Processor 10 may suitably use the excess mapping capacity by allowing register translation unit 25a to map to a physical register located other than register file 24. In the illustrated embodiment, the physical register may suitably be located in second register file 27, which is under control of AC control unit 25. In an alternate exemplary embodiment, pipe control unit 28 is further operative to remove bubbles from the instruction stream, i.e., "flushing", the execution pipelines behind branches that are mis-predicted and handling the execution of exception-causing instructions.

More particularly, BPU 40 suitably monitors speculative execution associated with branches or floating point instructions (i.e., execution of instructions speculatively issued after branches that may be mis-predicted or floating point instructions issued to FPU 70 that may fault after execution of speculatively-issued instructions). In the event that a branch is mis-predicted (a condition not known until the instruction reaches one of the execution or write-back stages for the branch) or a floating point instruction faults, the execution pipeline is repaired to the point of the mispredicted or faulting instruction (i.e., the execution pipeline is "flushed" behind the instruction) and an associated instruction fetch is restarted. Pipeline repair is preferably accomplished by creating processor state checkpoints at each pipeline stage as a predicted branch or floating point instruction enters the same. For these check pointed instructions, all processor resources (e.g., programmer-visible registers, the instruction pointer and the condition code register) that may suitably be modified by succeeding speculatively-issued instructions are check pointed. If a check pointed branch is mis-predicted or a check pointed floating point instruction faults, the execution pipeline is flushed behind the check pointed instruction. In the case of floating point instructions, this typically results in the entire execution pipeline being flushed. However, for a mis-predicted branch, there may be a paired instruction in EX and two instructions in WB that are nonetheless allowed to complete.

In accordance with the illustrated embodiment, writes from processor core 20 may suitably be queued into write buffer 75. Write buffers 75 provide an interface for writes to unified cache 55, while non-cacheable writes proceed directly from write buffers 75 to an external memory (shown and described in conjunction with FIG. 2). Write buffer logic may suitably support optional read sourcing and write gathering. In an exemplary embodiment, write buffer 75 includes twelve 32-bit write buffers, and write buffer allocation is performed by AC control unit 25.

FPU 70 includes a load/store stage with 4-deep load and store queues, a conversion stage (32-bit to 80-bit extended format), and an execution stage. Loads are controlled by processor core 20, and cacheable stores are directed through write buffers 75 (i.e., write buffer 75 is preferably allocated for each floating point store operation).

Figure 1B:
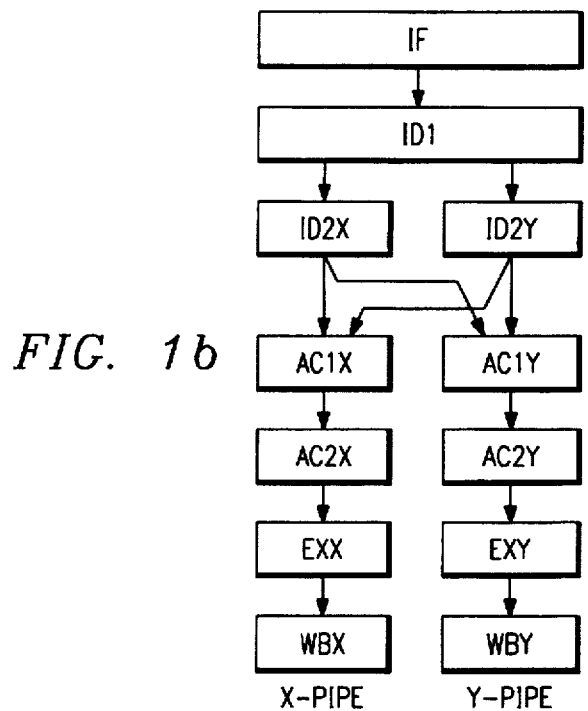
FIG. 1b illustrates a more detailed block diagram of seven exemplary pipelined stages of the processor of FIG. 1a, including X and Y execution pipelines.

Turning to FIG. 1b, illustrated is a more detailed block diagram of seven exemplary pipelined stages of processor 10 of FIG. 1a, including X and Y execution pipelines. As before, each of the X and Y execution pipelines includes IF, ID1, ID2, AC1, AC2, EX and WB stages. The discussion of FIG. 1b is undertaken with reference to FIG. 1a.

Exemplary IF stage provides a continuous instruction code stream into processor core 20. Prefetcher 35 is operative to fetch 16 bytes of instruction data into prefetch buffer 30 from either instruction line cache 65 or unified cache 55. BPU 40 is accessed with the prefetch address, and supplies target addresses to prefetcher 35 for predicted changes of flow, allowing prefetcher 35 to shift to a new code stream in a single clock cycle.

Exemplary decode stages ID1 and ID2 decode a variable length x86-based instruction set. Instruction decoder 21 retrieves 16 bytes of instruction data from prefetch buffer 30 each clock cycle. In ID1, the length of two instructions is decoded (one each for the X and Y execution pipelines) to obtain X and Y instruction pointers, a corresponding X and Y bytes-used signal is returned to prefetch buffer 30 which subsequently increments for the next 16 byte transfer. Also in ID1, certain instruction types are determined, such as changes of flow, and immediate or displacement operands are separated. In ID2, the decoding of X and Y instructions is completed, generating entry points for "microROM" and decoding addressing modes and register fields.

The optimum pipeline, X or Y, for executing an instruction is suitably determined during the ID stages, causing the instruction to be issued into that pipeline. In an exemplary embodiment, circuitry is provided for pipeline switching which suitably enables instructions to be switched from ID2X to AC1 Y and from ID2Y to AC1X, as certain instructions (e.g., change of flow, floating point, exclusive or other like instructions) may only be issued in one of the two pipelines.

"Exclusive instructions," as the phrase is used herein, include any instructions that may fault within the EX pipeline stage, as well as certain instruction types, such as protected mode segment loads, string, special register access (control, debug, test, etc.), Multiply/Divide, Input/Output, PUSHA/POPA (PUSH all/POP all), task switch and the like. Exclusive instructions may suitably use the resources of both execution pipelines, exclusive instructions are preferably issued alone from the ID stage.

Exemplary address calculation stages AC1 and AC2 calculate addresses for memory references and supply memory operands. During AC1 two 32 bit linear (three operand) addresses are preferably calculated per clock cycle. Data dependencies are checked and resolved using register translation unit 25a and the 31 physical registers in register file 24 are advantageously used to map eight general purpose, programmer-visible logical registers in accordance with x86-based architecture, namely: EAX, EBX, ECX, EDX, EDI, ESI, EBP and ESP. During AC2, register file 24 and unified cache 55 are accessed with the physical address. For cache hits, cache access time for multi-ported, unified cache 55 is the same as that of a register, effectively extending the register set. The physical address is either the linear address, or if address translation is enabled, a translated address generated by ATU 50.

The AC stage preferably includes eight logical, or architectural, registers, representing the x86-based register set. In a preferred embodiment, the logical register corresponding to the stackpointer ("ESP") contains the actual stackpointer (instead of simply a copy thereof) when control of the stackpointer is allocated to AC1. If an instruction requires one or more address calculations, AC1 is operative to wait until the required data of the logical registers are valid before accessing those registers. During AC2, operands are obtained by accessing register file 24, and unified cache 55, with the physical address. The physical address therefore is preferably either the linear address, or if address translation is enabled, a translated address generated by ATU 50.

Exemplary ATU 50 is operative to generate translated addresses, preferably using a suitable translation lookaside buffer ("TLB") or the like, from the linear address using information from page tables in memory and local workspace control registers. Unified cache 55 is virtually indexed and physically tagged to permit, when address translation is enabled, set selection with the untranslated address (available at the end of AC1) and, for each set, tag comparison with the translated address from ATU 50 (available early in AC2). In the illustrated embodiment, segmentation or address translation violation checks are suitably performed in AC2.

Instructions within a given instruction code stream are preferably kept in order until it is determined that out-of-order execution of the same will not cause an exception. This determination may suitably be made during or before AC2, although floating point and certain exclusive instructions may suitably cause exceptions during execution. Instructions are passed from AC2 to EX (floating point instructions are passed to FPU 70). Instructions spend a variable number of clock cycles in EX as many of the same may execute out of order. Integer instructions may cause exceptions in EX, they are therefore designated as exclusive and issued alone into both execution pipelines, thereby ensuring that exceptions are handled in order.

Exemplary execution stages EXX and EXY suitably perform the operations defined by a given instruction using one or more of adder, logic, shifter, etc. functional units. The EXX execution stage may also include multiplication and division hardware.

Exemplary write back stage ("WB") updates register file 24, condition codes, as well as other parts of an suitable associated processing system with the results of the previously executed instruction. Typically, register file 24 is written in phase 1 ("PH1") of WB and read in phase 2 ("PH2") of AC2.

Additional disclosure of write buffers 75, speculative execution and the microsequencer may be found in Ser. No. 08/138,654, entitled "Control of Data for Speculative Execution and Exception Handling in a Processor with Write Buffer;" Ser. No. 08/138,783, entitled "Branch Processing Unit;" Ser. No. 08/138,781, entitled "Speculative Execution in a Pipelined Processor" and Ser. No. 08/138,855, entitled "Microprocessor Having Single Clock Instruction Decode Architecture", all of which are assigned to the assignee of the present invention and incorporated herein by reference for all purposes.

Figure 2:
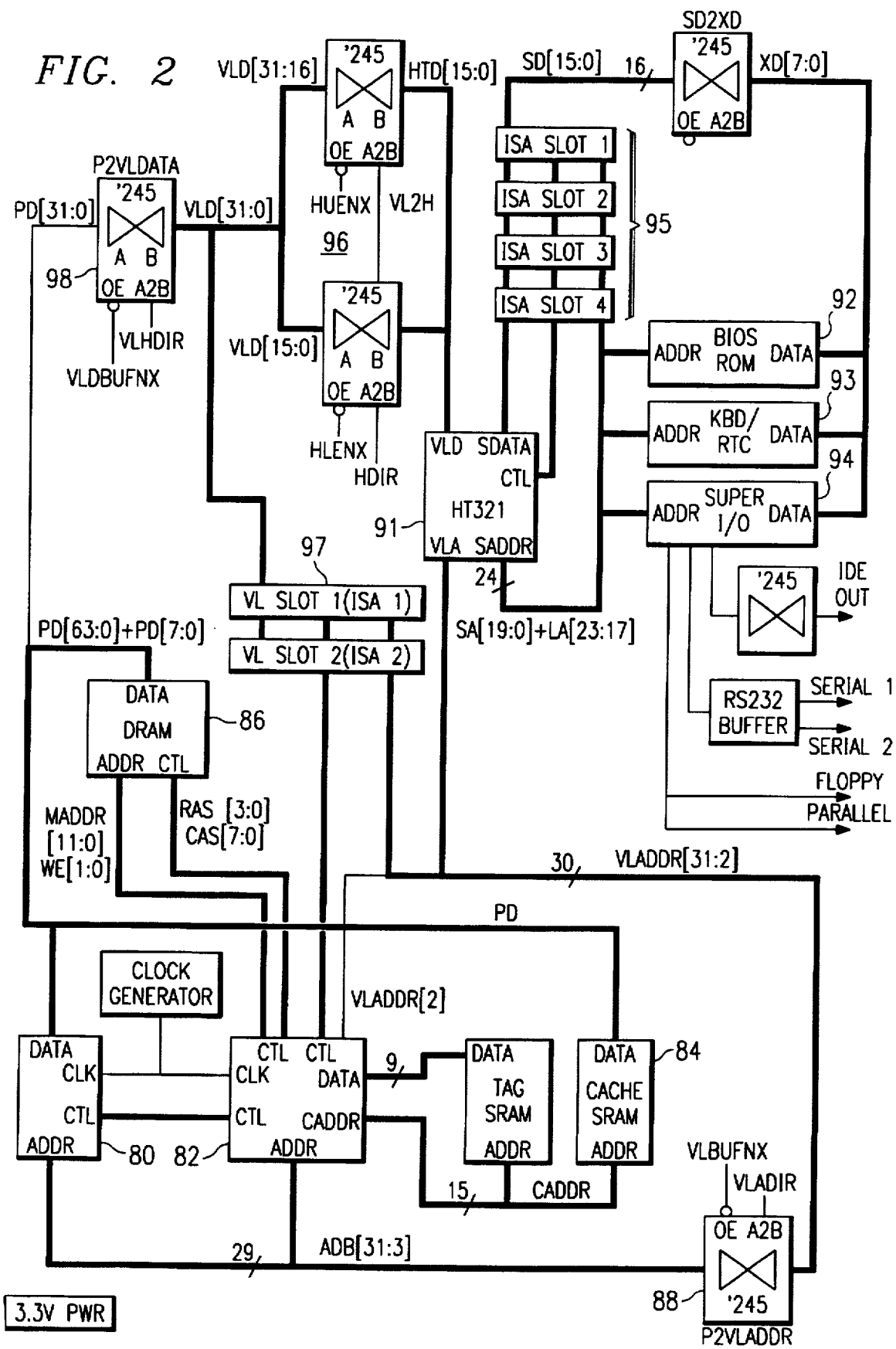
FIG. 2 illustrates a block diagram of an exemplary processor system incorporating the processor of FIG. 1a and 1b.

Turning to FIG. 2, illustrated is an exemplary processor system design, in the form of a motherboard, that advantageously uses exemplary processor 10 of FIG. 1a and 1b in cooperation with a single chip memory/bus controller 82. Controller 82 provides an interface between processor 10 and an external memory subsystem controlling data movement over DBS, the 64-bit processor data bus. The external memory subsystem includes level two cache 84 and main memory 86. In accordance with the illustrated embodiment, the data path may suitably be external to controller 82 thereby reducing its pin count and cost.

Controller 82 preferably interfaces with ADB, the 32-bit address bus, directly and includes a one bit wide data port (not shown) for reading and writing registers within controller 82. A bidirectional isolation buffer 88 is preferably provided as an address interface between processor 10 and a conventional video local bus ("VL-Bus") and a conventional industry standard architecture ("ISA") bus. Controller 82 provides control for VL-Bus and ISA bus interfaces. A VL/ISA interface chip 91 provides standard interfaces to an exemplary 32-bit VL-Bus and an exemplary 16-bit ISA bus. The ISA bus may suitable interface to a basic input/output system ("BIOS") 92, a keyboard controller 93, and an I/O chip 94, as well as standard ISA slots 95. The interface chip 91 preferably interfaces to the 32-bit VL-bus through a bidirectional 32/16 multiplexer 96 formed by multiple high/low word isolation buffers. The VL-Bus interfaces to standard VL-Bus slots 97, and through a bidirectional isolation buffer 98 to the low double word of PD.

Figure 3:
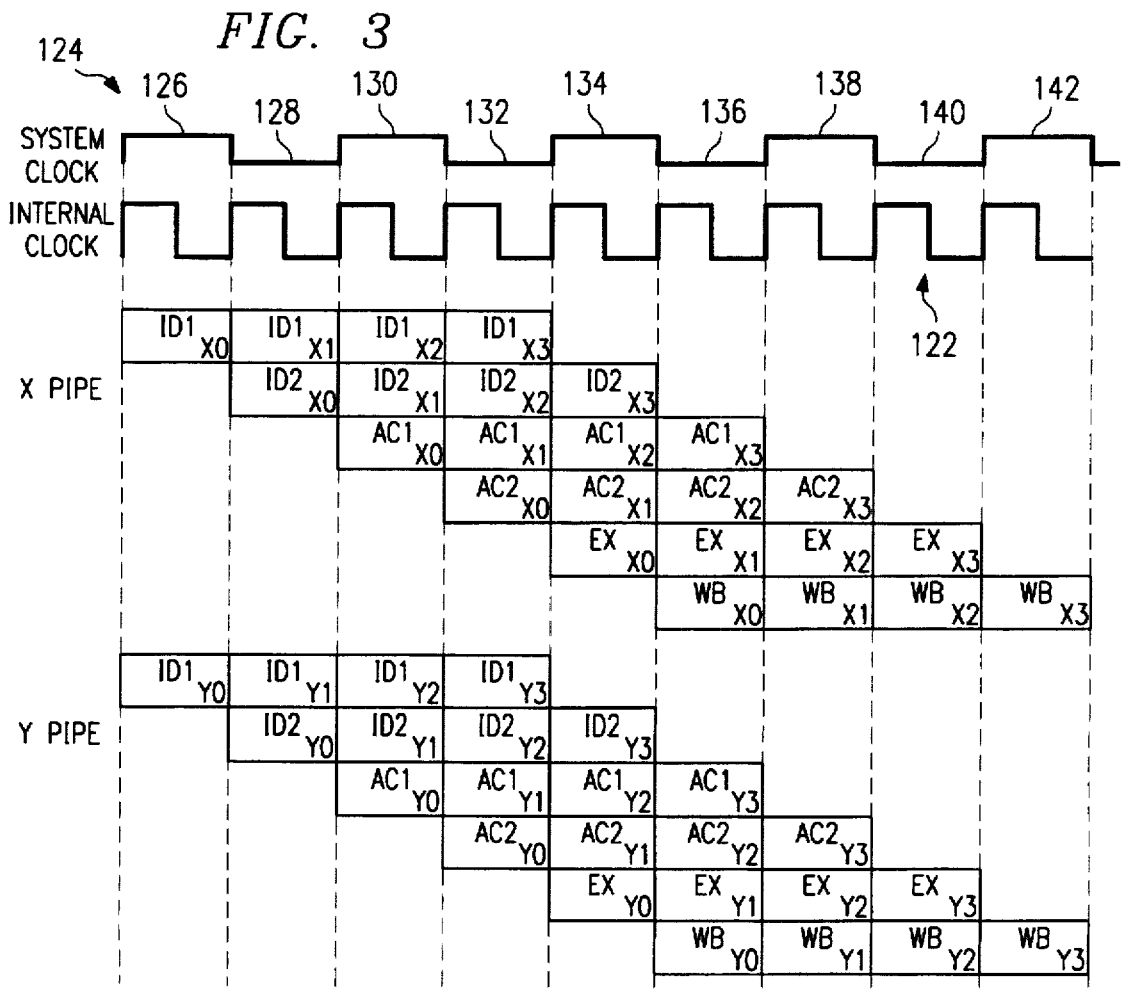
FIG. 3 illustrates an exemplary timing diagram demonstrating the flow of instructions through a pipeline in accordance with the exemplary processor of FIG. 1a through 2.

Turning to FIG. 3, illustrated is an exemplary timing diagram demonstrating the flow of instructions through a pipeline in accordance with processor 10 of FIG. 1a, 1b and 2. The timing diagram illustrates the flow of eight instructions through the pipeline, showing overlapping execution of instructions for a two pipeline architecture. Processor 10 preferably uses an internal clock 122 that is a multiple of a system clock 124. In the illustrated embodiment, internal clock 122 operates at twice the frequency of system clock 124.

During a first internal clock cycle 126, the ID1 stage operates respectively on instructions X0 and Y0. During internal clock cycle 128, instructions X0 and Y0 are in the ID2 stage (X0 being in ID2X and Y0 being in ID2Y) and instructions X1 and Y1 are in the ID1 stage. During internal clock cycle 130, instructions X2 and Y2 are in the ID1 stage, instructions X1 and Y1 are in the ID2 stage (X1 being in ID2X and Y1 being in ID2Y) and instructions X0 and Y0 are in the AC1 stage (X0 being in AC1X and Y0) being in AC1Y). During internal clock cycle 132, instructions X3 and Y3 are in the ID1 stage, instructions X2 and Y2 are in the ID2 stage, instructions X1 and Y1 are in the AC1 stage and instructions X0 and Y0 are in the AC2 stage.

The execution portion of each of the foregoing instructions is performed during sequential clock cycles, namely, clock cycles 134 to 140. This is an important aspect a pipelined architecture as the total instructions completed per clock cycle increases without reducing the execution time of individual instructions. Greater instruction throughput is thereby achieved without requiring greater demands on the speed of the hardware.

It should be noted that FIG. 3 illustrates an optimum condition, as no stage requires more than a single clock cycle. In actuality, however, one or more stages may suitably require additional clock cycles for completion, thereby changing instruction flow through the other pipeline stages. Further, instruction flow through one pipeline may suitably depend upon the flow of other instructions in the same or the other pipeline.

Figure 4:
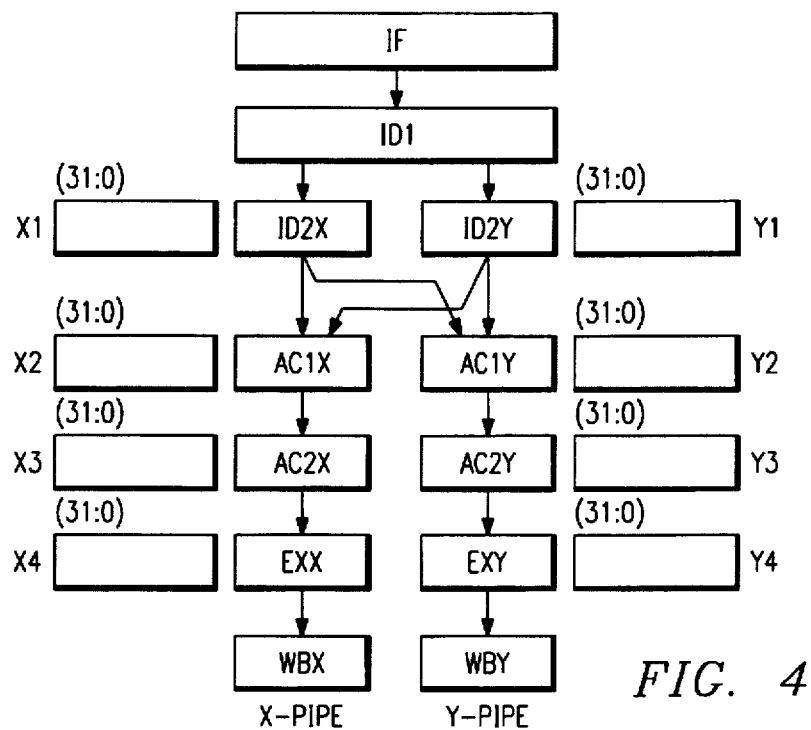
FIG. 4 illustrates a block diagram of an exemplary set of tracking registers corresponding to the exemplary pipelined stages of FIG. 1b.

Turning now to FIG. 4, illustrated is a block diagram of an exemplary set of tracking registers corresponding to the exemplary pipelined stages of FIG. 1b. Exemplary tracking registers X1,X2, X3, and X4 are respectively associated with exemplary pipeline stages ID2X, AC1X, AC2X, and EXX of pipeline X, and exemplary tracking registers Y1, Y2, Y3, and Y4 are respectively associated with exemplary pipeline stages ID2Y, AC1Y, AC2Y, and EXY of pipeline Y, all of FIG. 1b. Each exemplary tracking register comprises 32 bits. Each bit of the 32 bits comprising a tracking register is associated with a particular physical register. When an instruction being processed in any one of the exemplary pipeline stages ID2X, AC1X, AC2X, EXX, ID2Y, AC1Y, AC2Y or EXY requires a read of a physical register, a bit (corresponding to the particular physical register to be read) in the tracking register (corresponding to the particular processing stage) is set.

Figure 5:
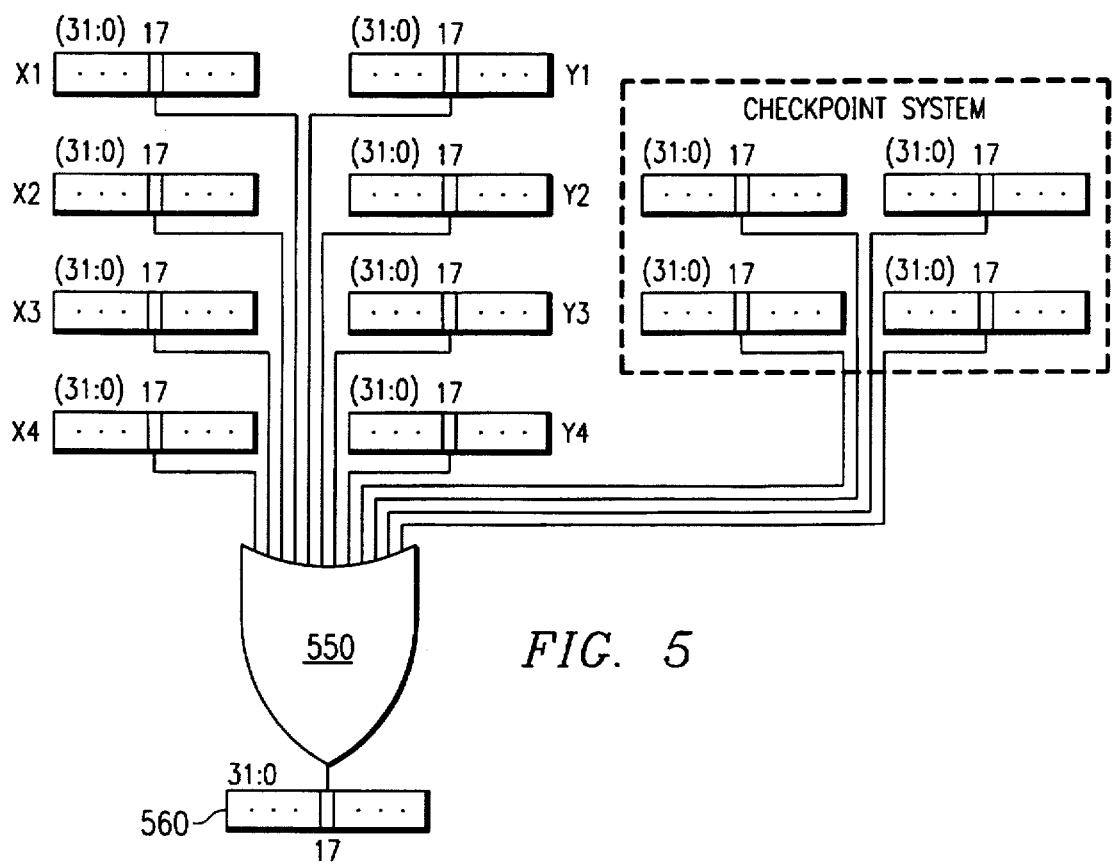
FIG. 5 illustrates a block diagram of particular tracking indicators of the tracking registers of FIG. 4 corresponding to a particular physical register, exemplary combinatorial circuitry and an availability register.

Turning now to FIG. 5, illustrated is a block diagram of particular tracking indicators of the tracking registers of FIG. 4 corresponding to a particular physical register. FIG. 5 further illustrates exemplary combinatorial circuitry for determining whether the particular physical register is free for renaming and an availability register for collecting together the determination from the combinatorial circuitry and other combinatorial circuitry corresponding to the other respective tracking indicators. FIG. 5 also further illustrates an exemplary checkpoint system according to the present invention that checkpoints physical registers for purposes of conditional branch processing and speculative execution of instructions.

As discussed with reference to FIG. 4, each bit of 32-bit tracking registers X1, X2, X3, X4, Y1, Y2, Y3, and Y4 corresponds to 1 of 32 possible physical registers of processor 10. As an instruction proceeds through either exemplary pipeline X or Y, the contents of the tracking register at each stage in the pipeline is changed to reflect the read status of physical registers associated with the particular instruction. For example, if an instruction at stage ID2X requires physical register 17 to be read, bit 17 of tracking register X1 is set, placing bit 17 in a "read" state. When the instruction proceeds to pipeline stage AC1X, the contents of tracking register X2 is updated to reflect the required read of physical register 17. Thus, the contents of a particular tracking register is dependent on the instruction currently present in the pipeline stage associated with the particular tracking register.

In a preferred embodiment, a processor implementing the present invention may further include a checkpoint system that checkpoints physical registers for purposes of conditional branch processing and speculative execution of instructions. When the processor encounters a conditional branch instruction, it predicts whether the branch is to be taken and speculatively executes instructions at the predicted target address.

When the result of a conditional branch instruction is mis-predicted, the execution pipeline must be restored to the point of the mis-predicted instruction. In order to restore the pipeline to its prior state, however, requires that the state of each pipeline stage prior to the mis-predicted execution must be known and recoverable. This may suitably be accomplished by checkpointing processor resources so that they are not modified by succeeding speculatively-executed instructions. Whereas a logical register is a processor resource that may suitably be modified by a later-executed instruction, the contents of the physical registers containing the current values of the logical registers must be preserved until it is determined that the branch prediction is correct. The preservation of the physical registers is accomplished by checkpointing the physical registers at the point of the conditional branch.

When a conditional branch is encountered, the 8 physical registers currently mapped to the 8 logical registers are checkpointed. The checkpoint system includes 4 checkpoint registers corresponding to the 4 levels of branch prediction possible in the exemplary processor 10 of FIG. 1b. As with the tracking registers, each checkpoint register comprises 32 bits, each bit corresponding to 1 of 32 of the physical registers. Thus, when it is necessary to checkpoint the processor, 8 bits corresponding to each of the 8 physical registers to be checkpointed are set in one 1 of the 4 checkpoint registers. The status of each bit in the checkpoint registers is combined with the status of the corresponding bits in each tracking register in the combinatorial circuitry to determine the availability status of each physical register.

In a preferred embodiment of the present invention, combinatorial circuitry, comprising a plurality of exemplary OR gates 550, is used to determine the availability status of each physical register. Each exemplary OR gate is associated with one exemplary physical register. Each exemplary OR gate is further associated with 1 bit of 32-bit exemplary availability register 560, which bit is logically connected to the output of exemplary OR gate 550. Each exemplary OR gate receives 12 inputs from the bit of each tracking register and checkpoint register corresponding to the physical register associated with the particular exemplary OR gate. Thus, the output of exemplary OR gate 550 indicates availability of the corresponding exemplary physical register. The 32 bits of exemplary availability register 560 therefore reflects the present availability status of the 32 exemplary physical registers of processor 10.

Figure 6:
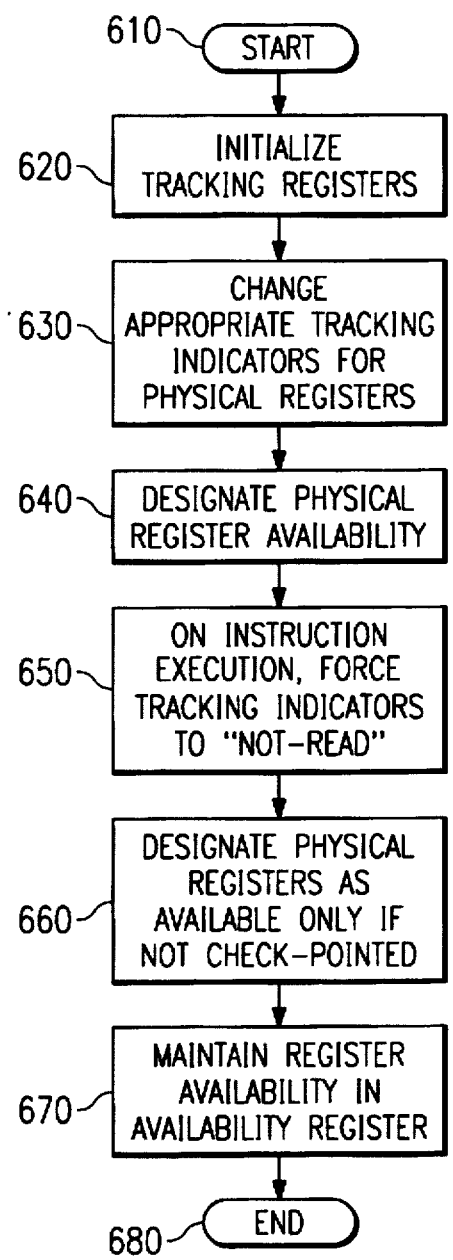
FIG. 6 illustrates a flow diagram of an exemplary embodiment of the method of the present invention.

FIG. 6 illustrates a flow diagram of an exemplary embodiment of the method of the present invention. The method for tracking the availability of physical registers begins in a start step 610, and proceeds to a step 620 where ID, AC and EX tracking registers corresponding to the ID, AC and EX processing stages are initialized. As discussed hereinabove, each of the ID, AC and EX tracking registers contains tracking indicators corresponding to physical registers of processor 10.

In a step 630, a particular tracking indicator of a particular tracking register is changed from a "not-read" state to a "read" state when an instruction being processed in a particular processing stage corresponding to the particular tracking register causes the particular processing stage to read a value from a particular physical register corresponding to the particular tracking indicator. A particular physical register is designated as available for use only when all particular tracking indicators of the ID, AC and EX tracking registers corresponding to the particular physical register are in the "not-read" state. Thus, in a step 640, each physical register is designated as available if all tracking indicators associated with that physical register are in the "not-read" state.

In a preferred embodiment, the method for tracking the availability of physical registers may further comprise a step 650 in which one particular tracking indicator of the tracking indicators corresponding to a particular physical register is forced to the "not-read" state when the instruction associated with the particular tracking indicator completes the EX processing stage.

Another preferred embodiment may suitably include a checkpoint system that checkpoints physical registers for purposes of conditional branch execution and speculative processing. Thus, the method of FIG. 6 may further comprise a step 660 in which a physical register is designated as available for use only when the checkpoint system has not checkpointed the particular physical register.

Another preferred embodiment may suitably include an availability register that contains availability indicators corresponding to the physical registers of the processor to be tracked. Thus, the method of FIG. 6 may further include a step 670 for maintaining availability indicators corresponding to the physical registers of the processor to be tracked in an availability register.

In step 670 a particular availability indicator corresponding to the particular physical register is changed from an "available" state to a "not-available" state when any of the particular tracking indicators of the tracking means corresponding to the particular physical register is in the "read" state as hereinabove described with reference to step 630 of FIG. 6. The exemplary method of the present invention illustrated in FIG. 6 terminates in a end step 680. In alternative and preferred embodiments, the method of FIG. 6 may be continually re-executed to update availability continually.

From the above, it is apparent that the present invention provides, in a pipelined processor having at least one execution pipeline for executing instructions, the execution pipeline including ID (decode), AC (address calculation), and EX (execution) processing stages to process instructions for the processor, the processor including a register translation system that controls a renaming of physical registers of the processor to logical registers thereof, a tracking circuit that tracks availability of the physical registers for the renaming, method of operation thereof and processor containing the same.

The tracking circuit includes: (1) ID, AC and EX tracking registers corresponding to the ID, AC and EX processing stages, each of the ID, AC and EX tracking registers containing tracking indicators corresponding to physical registers of the processor to be tracked, (2) read detection circuitry that changes a particular tracking indicator of a particular tracking register from a "not-read" state to a "read" state when an instruction being processed in a particular processing stage corresponding to the particular tracking register causes the particular processing stage to read a value from a particular physical register corresponding to the particular tracking indicator and (3) combinatorial circuitry that designates the particular physical register as available for the renaming only when all particular tracking indicators of the ID, AC and EX tracking registers corresponding to the particular physical register are in the "not-read" state.

Although the present invention and its advantages have been described in detail, those skilled in the art should understand that they can make various changes, substitutions and alterations herein without departing from the spirit and scope of the invention in its broadest form.

What is claimed is:

1. In a pipelined processor having at least one execution pipeline for executing instructions, said execution pipeline including ID (decode), AC (address calculation), and EX (execution) processing stages to process instructions for said processor, said processor including a register translation system that controls a renaming of physical registers of said processor to logical registers thereof, a tracking circuit that tracks availability of said physical registers for said renaming, comprising:

ID, AC and EX tracking registers corresponding to said ID, AC and EX processing stages, each of said ID, AC and EX tracking registers containing tracking indicators corresponding to physical registers of said processor to be tracked;

read detection circuitry that changes a particular tracking indicator of a particular tracking register from a "not-read" state to a "read" state when an instruction being processed in a particular processing stage corresponding to said particular tracking register causes said particular processing stage to read a value from a particular physical register corresponding to said particular tracking indicator; and combinatorial circuitry that designates said particular physical register as available for said renaming only when all particular tracking indicators of said ID, AC and EX tracking registers corresponding to said particular physical register are in said "not-read" state.

2. The tracking circuit as recited in claim 1 further comprising execution detection circuitry that forces said all particular tracking indicators of said ID, AC and EX tracking registers corresponding to said particular physical register to said "not-read" state when said instruction completes said EX processing stage.

3. The tracking circuit as recited in claim 1 wherein said processor further comprises a checkpoint system capable of checkpointing physical registers for purposes of speculative execution, said combinatorial circuitry designating said particular physical register as available for said renaming only when said checkpoint system has not checkpointed said particular physical register.

4. The tracking circuit as recited in claim 1 further comprising an availability register that contains availability indicators corresponding to said physical registers of said processor to be tracked, said combinatorial circuitry changing a particular availability indicator corresponding to said particular physical register from an "available" state to a "not-available" state when any of said particular tracking indicators of said ID, AC and EX tracking registers corresponding to said particular physical register is in said "read" state.

5. In a pipelined processor having at least one execution pipeline for executing instructions, said execution pipeline including ID (decode), AC (address calculation), and EX (execution) processing stages to process instructions for said processor, said processor including means for controlling a renaming of physical registers of said processor to logical registers thereof, a circuit for tracking availability of said physical registers for said renaming, comprising:

a plurality of tracking means, corresponding to said ID, AC and EX processing stages, for containing tracking indicators corresponding to physical registers of said processor to be tracked;

means for changing a particular tracking indicator of a particular tracking means from a "not-read" state to a "read" state when an instruction being processed in a particular processing stage corresponding to said particular tracking means causes said particular processing stage to read a value from a particular physical register corresponding to said particular tracking indicator; and means for designating said particular physical register as available for said renaming only when all particular tracking indicators of said tracking means corresponding to said particular physical register are in said "not-read" state.

6. The circuit as recited in claim 5 further comprising execution detection means for forcing said all particular tracking indicators of said tracking means corresponding to said particular physical register to said "not-read" state when said instruction completes said EX processing stage.

7. The circuit as recited in claim 5 wherein said processor further comprises checkpoint means for checkpointing physical registers for purposes of speculative execution, said checkpointing means designating said particular physical register as available for said renaming only when said checkpoint means has not checkpointed said particular physical register.

8. The circuit as recited in claim 5 further comprising availability register means for containing availability indicators corresponding to said physical registers of said processor to be tracked, said means for designating changing a particular availability indicator corresponding to said particular physical register from an "available" state to a "not-available" state when any of said particular tracking indicators of said tracking means corresponding to said particular physical register is in said "read" state.

9. In a pipelined processor having at least one execution pipeline for executing instructions, said execution pipeline including ID (decode), AC (address calculation), and EX (execution) processing stages to process instructions for said processor, said processor including a register translation system to control a renaming of physical registers of said processor to logical registers thereof, a method of tracking availability of said physical registers for said renaming, comprising the steps of:

initializing ID, AC and EX tracking registers corresponding to said ID, AC and EX processing stages, each of said ID, AC and EX tracking registers containing tracking indicators corresponding to physical registers of said processor to be tracked;

changing a particular tracking indicator of a particular tracking register from a "not-read" state to a "read" state when an instruction being processed in a particular processing stage corresponding to said particular tracking register causes said particular processing stage to read a value from a particular physical register corresponding to said particular tracking indicator; and designating said particular physical register as available for said renaming only when all particular tracking indicators of said ID, AC and EX tracking registers corresponding to said particular physical register are in said "not-read" state.

10. The method as recited in claim 9 further comprising the step of forcing said all particular tracking indicators of said tracking registers corresponding to said particular physical register to said "not-read" state when said instruction completes said EX processing stage.

11. The method as recited in claim 9 wherein said processor further comprises a checkpoint system that checkpoints physical registers for purposes of speculative execution, said step of designating comprising the step of designating said particular physical register as available for said renaming only when said checkpoint system has not checkpointed said particular physical register.

12. The method as recited in claim 9 further comprising the step of containing availability indicators corresponding to said physical registers of said processor to be tracked in an availability register, said step of designating comprising the step of changing a particular availability indicator corresponding to said particular physical register from an "available" state to a "not-available" state when any of said particular tracking indicators of said tracking registers corresponding to said particular physical register is in said "read" state.

13. A computer system, comprising:

(a) a pipelined processor having at least one execution pipeline for executing instructions, said execution pipeline including ID (decode), AC (address calculation), and EX (execution) processing stages to process instructions for said processor, said processor including a register translation system that controls a renaming of physical registers of said processor to logical registers thereof;

(b) system memory for storing instructions;

(c) said processor including instruction fetch logic that fetches instructions from said system memory; and (d) said processor further including a tracking circuit that tracks availability of said physical registers for said renaming, comprising:

(i) ID, AC and EX tracking registers corresponding to said ID, AC and EX processing stages, each of said ID, AC and EX tracking registers containing tracking indicators corresponding to physical registers of said processor to be tracked, (ii) read detection circuitry that changes a particular tracking indicator of a particular tracking register from a "not-read" state to a "read" state when an instruction being processed in a particular processing stage corresponding to said particular tracking register causes said particular processing stage to read a value from a particular physical register corresponding to said particular tracking indicator, and (iii) combinatorial circuitry that designates said particular physical register as available for said renaming only when all particular tracking indicators of said ID, AC and EX tracking registers corresponding to said particular physical register are in said "not-read" state.

14. The processor as recited in claim 13 wherein said tracking circuit further comprises execution detection circuitry that forces said all particular tracking indicators of said ID, AC and EX tracking registers corresponding to said particular physical register to said "not-read" state when said instruction completes said EX processing stage.

15. The processor as recited in claim 13 wherein said processor further comprises a checkpoint system capable of checkpointing physical registers for purposes of speculative execution, said combinatorial circuitry designating said particular physical register as available for said renaming only when said checkpoint system has not checkpointed said particular physical register.

16. The processor as recited in claim 13 wherein said tracking circuit further comprises an availability register that contains availability indicators corresponding to said physical registers of said processor to be tracked, said combinatorial circuitry changing a particular availability indicator corresponding to said particular physical register from an "available" state to a "not-available" state when any of said particular tracking indicators of said ID, AC and EX tracking registers corresponding to said particular physical register is in said "read" state.

17. A method of operating a computer system, comprising the steps of:

(a) applying power to a pipelined processor having at least one execution pipeline for executing instructions, said execution pipeline including ID (decode), AC (address calculation), and EX (execution) processing stages to process instructions for said processor, said processor including a register translation system to control a renaming of physical registers of said processor to logical registers thereof;

(b) storing instructions in a system memory;

(c) initializing ID, AC and EX tracking registers corresponding to said ID, AC and EX processing stages, each of said ID, AC and EX tracking registers containing tracking indicators corresponding to physical registers of said processor to be tracked;

(d) fetching instructions from said system memory;

(e) processing instructions in said processor;

(f) changing a particular tracking indicator of a particular tracking register from a "not-read" state to a "read" state when an instruction being processed in a particular processing stage corresponding to said particular tracking register causes said particular processing stage to read a value from a particular physical register corresponding to said particular tracking indicator; and (g) designating said particular physical register as available for said renaming only when all particular tracking indicators of said ID, AC and EX tracking registers corresponding to said particular physical register are in said "not-read" state.

18. The method as recited in claim 17 further comprising the step of forcing said all particular tracking indicators of said tracking means corresponding to said particular physical register to said "not-read" state when said instruction completes said EX processing stage.

19. The method as recited in claim 17 wherein said processor further comprises a checkpoint system that checkpoints physical registers for purposes of speculative execution, said step of designating comprising the step of designating said particular physical register as available for said renaming only when said checkpoint system has not checkpointed said particular physical register.

20. The method as recited in claim 17 further comprising the step of containing availability indicators corresponding to said physical registers of said processor to be tracked in an availability register, said step of designating comprising the step of changing a particular availability indicator corresponding to said particular physical register from an "available" state to a "not-available" state when any of said particular tracking indicators of said tracking registers corresponding to said particular physical register is in said "read" state.

* * * * *